United States Patent Office 3,448,290
Patented June 3, 1969

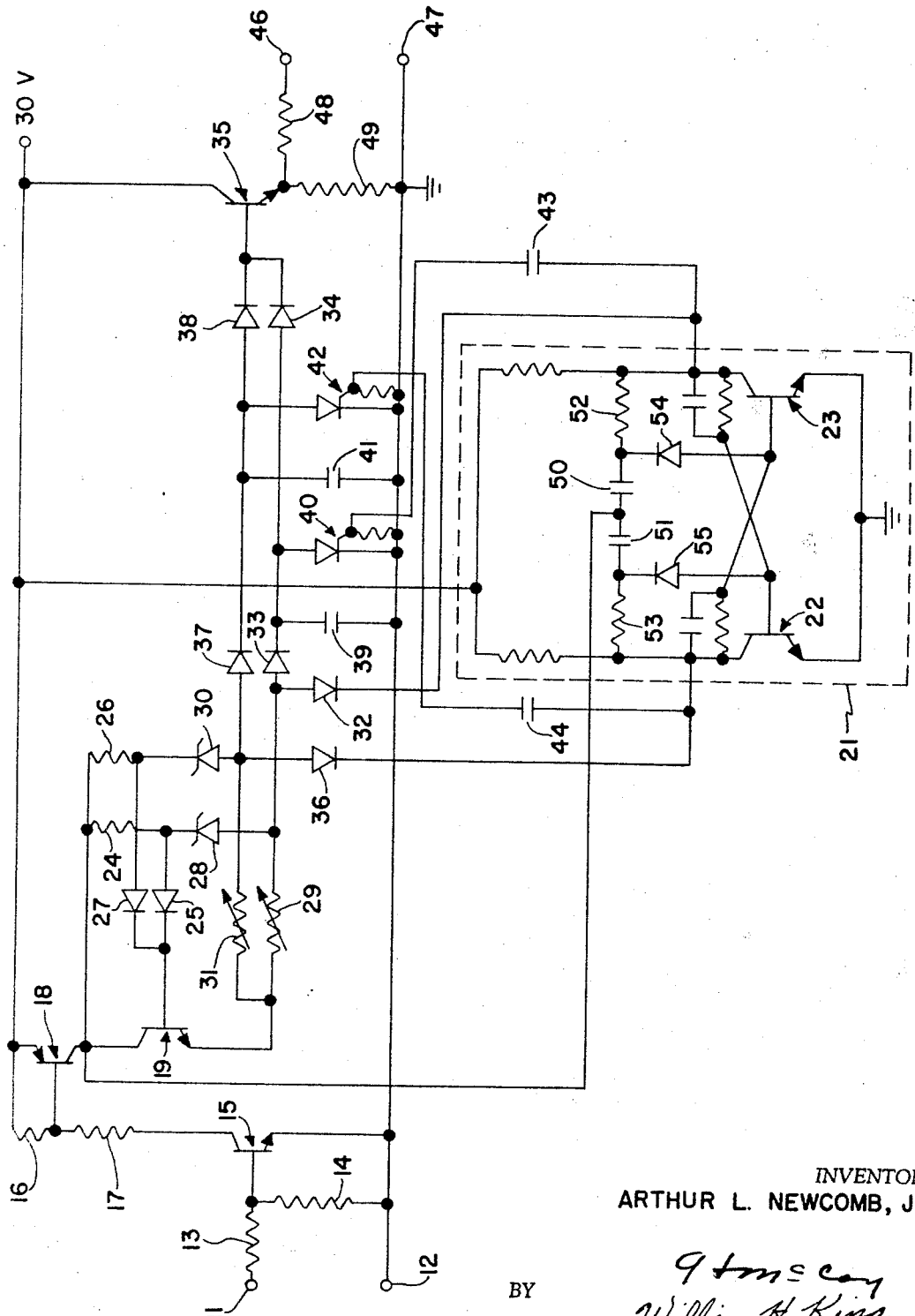

3,448,290
VARIABLE-WIDTH PULSE INTEGRATOR
Arthur L. Newcomb, Jr., Newport News, Va., assignor to the United States of America as represented by the National Aeronautics and Space Administration
Filed Mar. 15, 1966, Ser. No. 536,216
Int. Cl. H03k 5/20
U.S. Cl. 307—234                    9 Claims

ABSTRACT OF THE DISCLOSURE

A solid state device for converting variable-width pulses into an analog voltage. Two capacitors are alternately charged with a constant current during the durations of said variable-width pulses. The two capacitors are discharged during the times that they are not being discharged. The charged capacitors are selectively applied to the output of the device to provide the desired output analog voltage.

---

The invention described herein was made by an employee of the United States Government and may be manufactured and used by or for the Government for governmental purposes without the payment of any royalties thereon or therefor.

The invention relates generally to an integrator and more specifically concerns a solid state integrator for converting variable width pulses into an analog voltage.

In an electronic instrument where pulses are generated whose widths are proportional to some desirable parameter, a device is needed for producing an analog voltage having a magnitude indicative of the pulse widths. The infrared horizon scanner disclosed in U.S. Patent No. 3,038,077 is an instrument that creates a need for such a device. The output of this instrument is pulses whose widths are directly proportional to the attitude error of a space vehicle with respect to a planetary body. Integration of these pulses, for use with an attitude control system, is exceedingly difficult since the duty cycle (time between pulses versus pulse width) is extremely small at the point of interest (where attitude error approaches zero).

In conventional R–C integrators, duty cycle is a parameter which directly effects voltage fluctuations, or ripple. This undesirable ripple approaches the maximum at zero duty cycle.

Another prior art integrator uses two capacitors which are alternately charged and read. While one capacitor is being charged, the other is being read through a high input impedance circuit. The charge and read path are switched by a DPDT relay which is operated at the end of each pulse. Since relays have a limited operating lifetime, draw appreciable power, and cannot be switched in much less than two milliseconds, an integrator that uses them is undesirable for space applications.

It is therefore an object of this invention to provide a solid state integrating circuit for converting variable-width pulses to analog voltages.

Another object of this invention is to provide an integrator that has a very low ripple content in the low duty cycle range.

A further object of this invention is to provide an integrator for converting variable-width pulses into an analog voltage in which there is no time lag, or hysteresis, between the input and the output of the integrator.

Still another object of the invention is to provide an integrator, for converting pulse widths into an analog voltage, which has a low power consumption and a long lifetime for use on a spacecraft.

A still further object of this invention is to provide a pulse width integrator which has a low ripple content in its output over the entire range of the integrator.

The present invention is an integrator which operates similar to the two-capacitor integrator mentioned above. The invention consists essentially of two electrical circuits including a capacitor in each circuit. The input pulses are applied to a constant current network which produces a constant current in each of said two electrical circuits during the durations of the input pulses. The magnitude of this constant current is independent of the amplitudes of the input pulses. A bistable multivibrator in combination with two diodes provide means for alternately charging the two capacitors with the constant current in the two circuits. The bistable multivibrator in combination with two other capacitors and two silicon controlled switches provide means for alternately discharging the two capacitors. An OR gate is connected to the two capacitors so that the greater voltage across the two capacitors is applied to the output of the integrator. The amplitude of this output voltage is proportional to the widths of the input pulses.

Other objects and advantages of this invention will further become apparent hereinafter and in the single drawing which is a schematic diagram of the invention.

In describing the preferred embodiment of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawing, the numbers 11 and 12 designate the input terminals to the integrator. A resistor 13 and a resistor 14 are connected in series between terminals 11 and 12. The junction of resistors 13 and 14 is connected to the base of an NPN transistor 15 whose emitter is connected directly to ground. A resistor 16 and a resistor 17 are connected in series between a power source and the collector of transistor 15. The junction of resistors 16 and 17 is connected to the base of a PNP transistor 18 whose emitter is connected directly to the power source. The collector of transistor 18 is connected to the collector of an NPN transistor 19, and to a bistable multivibrator 21 including NPN transistors 22 and 23. The collector of transistor 18 is also connected to the base of transistor 19 through a resistor 24 and a diode 25, and through a resistor 26 and a diode 27. The junction of resistor 24 and diode 25 is connected to the emitter of transistor 19 through a Zener diode 28 and a variable resistor 29; and the junction of resistor 26 and diode 27 is connected to the emitter of transistor 19 through a Zener diode 30 and a variable resistor 31.

The junction of Zener diode 28 and variable resistor 29 is connected through a diode 32 to the collector of transistor 23 and also the junction is connected through diodes 33 and 34 to the base of an NPN transistor 35. The junction of Zener diode 30 and variable resistor 31 is connected through a diode 36 to the collector of transistor 22 and also the junction is connected through diodes 37 and 38 to the base of transistor 35. Zener diodes 28 and 30 and diodes 33 and 37 should be matched. A capacitor 39 and a silicon controlled switch 40 are each connected from the junction of diodes 33 and 34 to ground. A capacitor 41 and a silicon controlled switch 42 are each connected from the junction of diodes 37 and 38 to ground. Silicon controlled switches 40 and 42 each has a high impedance except when a positive voltage is applied to its terminal. Then it has a low impedance. A capacitor 43 is connected between the collector of transistor 23 and the control terminal of silicon controlled switch 40; and a capacitor 44 is connected between the collector of transistor 22 and the control terminal of silicon controlled switch 42. The collector of transistor 35 is connected directly to the power source. Output terminals 46 and 47 are connected across a resistor 48 and a resistor 49, the junction of which is connected to the emitter of transistor 35.

Multivibrator 21 is a conventional type multivibrator except that it contains circuitry to enable it to be triggered on the trailing edge of a pulse. This circuitry is capacitors 50 and 51, resistors 52 and 53, and diodes 54 and 55. Suppose that transistor 23 is conducting and transistor 22 is not conducting, and a positive pulse is applied to the junction of capacitors 50 and 51. The circuit through capacitor 50, resistor 52 and transistor 23 to ground forms a differentiating circuit which produces a sharp negative pulse at the trailing edge of the positive pulse. This sharp negative pulse is applied through diode 54 to the base of transistor 23 to cut off transistor 23 and cause transistor 22 to become conductive. The trailing edge of the next positive pulse produces a sharp negative pulse at the junction of capacitor 51 and resistor 53 which is applied through diode 55 to the base of transistor 22 to cut it off and cause transistor 23 to again become conductive.

The circuitry consisting of transistor 19, Zener diodes 28 and 30 and variable resistors 29 and 31 is a constant current circuit. Resistors 24 and 26 are Zener-bias resistors. This circuitry insures the linearity of the output voltage with respect to the width of the input pulses. Each time an input pulse is applied to input terminals 11 and 12 a constant current is produced at the junction of Zener diode 28 and variable resistor 29 and at the junction of Zener diode 30 and variable resistor 31. These currents are present throughout the duration of each pulse. The magnitudes of the currents can be regulated by resistors 29 and 31.

Diode 33 prevents capacitor 39 from discharging through resistors 29 and 20 to ground and diode 37 prevents capacitor 41 from discharging through resistors 31 and 20 to ground. Diodes 34 and 38 form an OR gate which insures that the higher of the two voltages across capacitors 39 and 41 is applied to the base of transistor 35. Transistor 35 is connected in an emitter-follower circuit to provide a high impedance to prevent discharging of capacitors 39 and 41, while maintaining a relatively low output impedance.

In operation when a first input pulse is applied to input terminals 11 and 12, it causes the base of transistor 15 to become positive which causes the transistor to conduct and produce a voltage drop across resistor 16. The only requirement made of the input pulse is that it has a fall time sufficiently fast to trigger multivibrator 21 and an amplitude great enough to saturate transistor 15. The voltage drop across resistor 16 causes transistor 18 to conduct and produce a positive voltage at its collector. This positive voltage is applied to the constant current network consisting of transistor 19, Zener diodes 28 and 30 and variable resistors 29 and 31. Consequently, currents appear at both the junction of Zener diode 28 and variable resistor 29, and the junction of diode 30 and variable resistor 31. At the time the first input pulse is applied to the input terminals one of the transistors in multivibrator 21 is conducting. Let us assume that the one that is conducting is transistor 23. Then the collector of transistor 23 is approximately at ground potential which allows the current at the junction of Zener diode 28 and variable resistor 29 to flow through diode 32 to ground. At the same time, the collector of transistor 22 is at a positive potential which biases diode 36 so that it has a very high impedance. Thus, the current at the junction of Zener diode 30 and variable resistor 31 flows through diode 37 into capacitor 41, thereby charging the capacitor. At the end of this first pulse, a voltage appears across the capacitor 41 that is proportional to the duration of the pulse. This voltage is applied through diode 38 to the base of transistor 35 thereby producing an output voltage across terminals 46 and 47. The amplitude of this output voltage is proportional to the width of the input pulse.

The pulse at the collector of transistor 18 is applied to the junction of capacitors 50 and 51. Consequently, at the conclusion of this first pulse, a sharp negative pulse is produced between the junction of capacitor 50 and resistor 52. This pulse is applied through diode 54 to the base of transistor 23 which causes transistor 23 to cut off. When transistor 23 is cut off, transistor 22 automatically becomes conductive. When the second input pulse is applied to terminals 11 and 12, the collector of transistor 22 is connected to ground, allowing the current at the junction of Zener diode 30 and variable resistor 31 to flow through diode 36 to ground. Diode 37 prevents capacitor 41 from discharging through diode 36. Since transistor 23 is now cut off, the collector of transistor 23 is at a high positive potential which biases diode 32 so that the current at the junction of Zener diodes 28 and variable resistor 29 will flow through diode 33 into capacitor 39 and charge it. At the termination of the second pulse a sharp negative pulse is produced at the junction of capacitor 51 and resistor 53 which is applied through diode 55 to the base of transistor 22 which causes transistor 22 to cut off. When transistor 22 is cut off, its collector voltage becomes positive and transistor 23 automatically becomes conductive. This rise in voltage on the collector of transistor 22 is applied through capacitor 44 to the control terminal of silicon controlled switch 42 which lowers the impedance across the switch. This allows capacitor 41 to discharge through the switch to ground. At this time, the voltage across capacitor 39 is proportional to the width of the second input pulse. This voltage across capacitor 39 is applied through diode 34 to the base of transistor 35 which produces a voltage at output terminals 46 and 47 proportional to the width of the second input pulse.

When the third input pulse is applied to input terminals 11 and 12 the resulting constant current at the junction of Zener diode 28 and variable resistor 29 passes through diode 32 and transistor 23 to ground. The current at the junction of Zener diode 30 and variable resistor 31 passes through diode 37 and charges capacitor 41. This process continues for each additional input pulse. It should be noted that from the termination of the first pulse to the termination of the second pulse the voltage across output terminals 46 and 47 is proportional to the width of the first pulse; and from the termination of the second pulse to the termination of the third pulse the output voltage is proportional to the width of the second pulse. As can be seen the output of the integrator is always proportional to the width of the last input pulse applied to it. This output will be present from the termination of the last input pulse until the termination of the next input pulse. The output of the integrator can be considered as an integral function of the input on a single pulse basis, or as an RMS (root mean square) equivalent of a series of evenly spaced pulses.

The advantages of the integrator that constitutes this invention are numerous. Its output is linearly proportional to the width of the input pulses; it is operable for extremely small duty cycles; the output has a very low ripple content over the entire range of the integrator; it has a low power consumption and a long lifetime making it desirable for space applications; and there is no time lag, or hysteresis, between its input and output.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims. Although the integrator is intended for indicating position in a spacecraft attitude sensing system, it could prove useful in any similar application where low duty cycles might be encountered. For example, it may convert voice modulated variable-width pulses or telemetered variable-width pulse intelligence to analog voltage changes over narrow bandwidth channels.

What is claimed as new and desired to be secured by Letters Patent of the United States is:

1. A variable-width pulse integrator comprising: means receiving the input pulses to be integrated, for producing a constant current during the durations of said input pulses that is independent of the amplitudes of the input pulses; a first and a second capacitor means; means for alternately charging said first and second capacitor means with said constant current during the durations of said input pulses; means for discharging each capacitor during the time that it is not being charged; and means for applying the larger of the voltages across said first and second capacitor means to the output of said integrator whereby the amplitude of the voltage at the output of said integrator is proportional to said input pulses.

2. A variable-width pulse integrator according to claim 1 wherein said means for alternately charging said first and second capacitor means includes a bistable multivibrator.

3. A variable-width pulse integrator according to claim 1 wherein said means for applying the larger of the voltages across said first and second capacitor means to the output of said integrator includes an OR gate.

4. A variable-width pulse integrator comprising: a first electrical circuit including a first capacitor; a second electrical circuit including a second capacitor; means, receiving the input pulses to be integrated, for producing a constant current in said first and second electrical circuits during the durations of said input pulses; a bistable multivibrator which receives said input pulses and changes state after receiving each input pulse; means including said multivibrator for steering the constant current in said first electrical circuit into said first capacitor to charge it while said multivibrator is in one of its two states and for steering the constant current in said second electrical circuit into said second capacitor to charge it while said multivibrator is in the other of its two states; means including said multivibrator for discharging said second capacitor while said multivibrator is in its said one state and for discharging said first capacitor while said multivibrator is in its said other state; and means for applying the larger of the two voltages across said first and second capacitors to the output of said integrator whereby the amplitude of the voltage output of said integrator is directly proportional to the widths of the input pulses.

5. A variable-width pulse integrator according to claim 4 wherein said bistable multivibrator includes means that causes it to change state at the terminal end of each input pulse.

6. A variable-width pulse integrator according to claim 4 wherein said means for steering the constant current in said first and second electrical circuits into said first and second capacitors includes two diodes.

7. A variable-width pulse integrator according to claim 4 wherein said means for applying the larger of the two voltages across said first and second capacitors to the output of said integrator includes an OR gate.

8. A variable-width pulse integrator according to claim 4 wherein said means for discharging said first and second capacitors includes a first switch connected across said first capacitor and a second switch connected across said second capacitor with both switches being controlled by said multivibrator.

9. A variable-width pulse integrator according to claim 8 wherein said first and second switches are silicon controlled switches.

References Cited

UNITED STATES PATENTS

| | | | |
|---|---|---|---|
| 2,888,579 | 5/1959 | Wanlass | 307—218 |
| 3,076,933 | 2/1963 | Negrete | 235—183 |
| 3,099,001 | 7/1963 | Syptak | 307—246 |

ARTHUR GAUSS, *Primary Examiner.*

B. P. DAVIS, *Assistant Examiner.*

U.S. Cl. X.R.

307—229, 247; 328—111, 127